June 23, 1942.  W. C. LOCKWOOD  2,287,481
EXPOSURE METER FILM CARTON
Filed Jan. 22, 1940
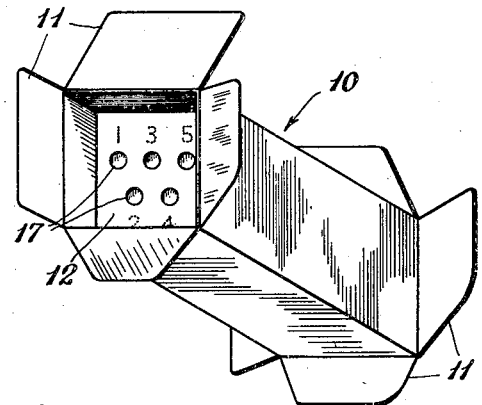
Fig.1
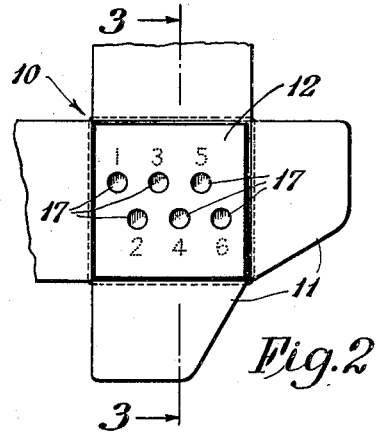
Fig.2
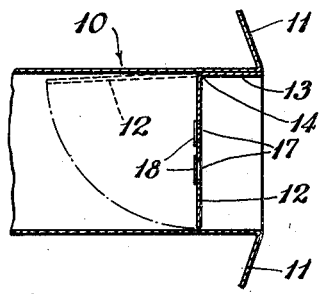
Fig.3
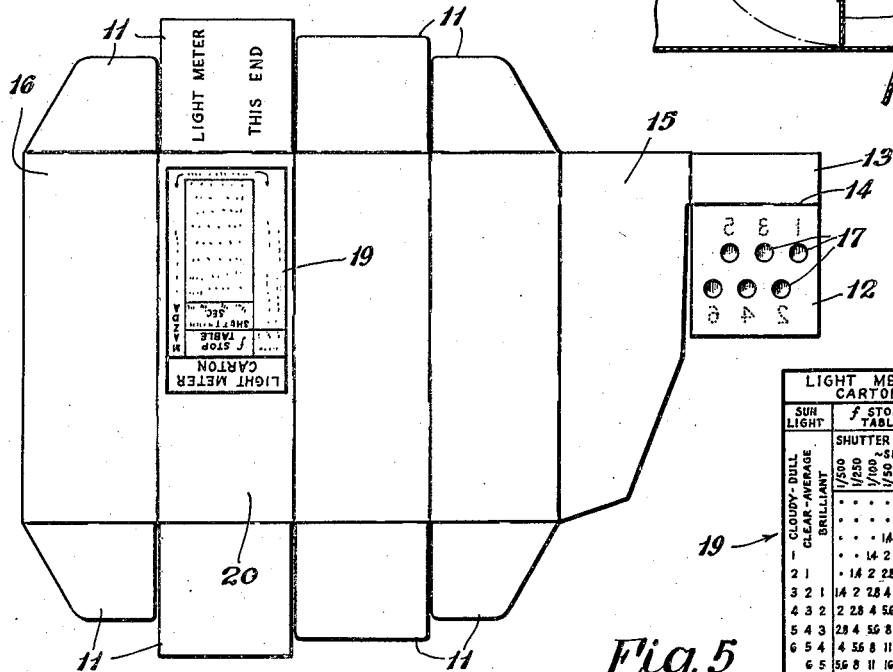
Fig.4
Fig.5
INVENTOR
William C. Lockwood
BY
ATTORNEY Patented June 23, 1942

2,287,481

UNITED STATES PATENT OFFICE 2,287,481

EXPOSURE METER FILM CARTON

William C. Lockwood, Chicago, Ill.

Application January 22, 1940, Serial No. 314,937

4 Claims. (Cl. 88—23)

This invention relates to a new and improved photographic film carton, and more particularly to a photographic film carton which also functions as an accurate exposure meter for the purpose of determining the proper exposure under various light conditions for the particular type of film carried in the carton.

There is presently being manufactured and generally used a large number of classes or types of photographic films. Each type or class of film is distinguished by the particular type of light sensitive emulsion which it carries. Thus, both colored films and black and white films are available and in general use which have emulsions of differing sensitivities to light. Also, as is well known, the factor of difference in sensitivity between two given types of film when exposed to light from a given source may be entirely different and unrelated to the factor of difference in sensitivity between the same two films when exposed to light of the same intensity but from a different source.

Owing to the large number of different types of films of varying characteristics, such as aforesaid, it is impossible, except in the case of unusually experienced individuals, for the user of the film to regularly arrive at, without the aid of some accurate light measuring instrument, the approximately correct exposure for a given film under given light conditions.

In accordance with the present invention, the carton or box in which a given type of film is packed for delivery to the ultimate user is provided with an exposure meter which is particularly designed to give, with the utmost simplicity of operation and manipulation, the correct exposure under various light conditions for the particular type of film supplied to the user in the box or carton by the film manufacturer.

The invention will be fully understood from the following description, illustrated by the accompanying drawing, in which:

Fig. 1 is an isometric view of a film box embodying the present invention;

Fig. 2 is a plan view of the forward end of the box shown in Fig. 1;

Fig. 3 is a vertical section taken on line 3—3 of Fig. 2;

Fig. 4 is a plan view of the outer face of the heavy paper blank which when folded forms the box shown in Fig. 1; and Fig. 5 is an enlarged detail view of the chart or table provided on one side of the box.

Referring more in detail to the drawing; 10 designates a carton or box of the conventional type in which is packed for shipment for ultimate delivery to the user a single roll or spool of photographic film (not shown) of the type which is commonly used. Such roll or spool of film may be protected either by a paper wrapping or so-called leader, or may be enclosed, for protection from light, in a conventional type of metal magazine or cassette. Each end of the box 10 is provided with the usual flaps or tabs 11 which when folded enclose and seal the ends of the box 10.

The interior of the box 10 is provided with a partition member or flap 12 which, as will be apparent from Figs. 1, 2 and 3, divides the interior of the box 10 into two compartments. The partition or flap 12, as shown in Fig. 3, is hinged at one of its edges while the other three edges are free and unattached whereby the partition or flap 12 may be swung into a position in which it is parallel to and rests along the inner face of a side wall of the box 100 whereby it does not in any way interfere with the use of the box 10 as a film carton. In the embodiment shown (as will be noted from Fig. 4), the partition 12 is a part of a tab 13 formed on the heavy paper blank. The tab 13 is in turn carried by the tab 15. The upper face of the tab 15 (Fig. 4) is cemented or glued to the inner face of the side wall 16 (the blank, of course, being folded along the lines of fold shown in Fig. 4), to form the box 10. Preferably, the upper face of tab 13 is cemented or glued to the inner face of the side wall 20 in order to securely support the partition or flap 12 within the film box 10.

The hinged partition 12 is provided with a series of apertures 17. Any desired number of such apertures 17 may be employed although ordinarily with the present types of film the number used will vary from about six to about eight. As will be noted each aperture is progressively numbered, in the embodiment shown such numbering beginning with the numeral 1 and ending with the numeral 6. These numerical designations may be either printed or formed by a series of small perforations, the latter being employed in the embodiment illustrated.

Each aperture 17 of the hinged partition 12 is covered with a sheet or film of material 18. The covering 18 for each aperture 17 differs in its relative transparency with respect to the covering for the other of the apertures 17 with the result that the covering for one aperture (indicated as 1 in the embodiment shown) may be relatively transparent whereby objects may be viewed through it in relatively poor light, and the coverings 18 for each of the other apertures (indicated as 2 to 6 in the embodiment shown) are progressively lacking in transparency with the result that the least transparent aperture (indicated as 6 in the embodiment shown) is such that objects may be viewed through it only when subjected to extremely bright light. (In the embodiment shown, aperture 2 is less transparent than aperture 1, 3 is less transparent than 2, 4 is less transparent than 3, 5 is less transparent than 4, and 6 is less transparent than 5), the partition 12 thus constitutes a visual or optical type light measuring means.

As shown in Fig. 4 the outer face of one side wall of the box 10 is provided with chart or table 19 which is shown in more detail in Fig. 5. It will be noted that this chart 19 contains four columns of numerals running from 1 to 6, inclusive, three of these columns being under the heading "Sunlight" and being respectively labelled "Cloudy-dull," "Clear-average" and "Brilliant," while the fourth and remaining column is labelled "Mazda." The central portion of the chart 19 contains a table labelled "f-stop table" which contains a series of columns arranged by shutter speeds varying from $\frac{1}{10}$ sec. to $\frac{1}{500}$ sec., each such column containing a series of f-stop designations ranging from as large as f 1.4 to as small as f 32.

The various calibrations on the chart 19 and the respective degrees of transparency of the coverings 18 of the apertures 17 are integrated to fit the requirements of the particular type of film which is shipped in the box or carton 10.

The operation or use of the device may be as follows:

The box 10 containing the spool or roll of film is opened by the user in the usual way, i. e., the tabs 11 on one end of the box 10 are opened and the spool or roll of film removed and inserted in the camera. The user also opens the tabs 11 on the other end of the box 10, and then extends his finger through the end of the box 10 (opposite the end near which the partition or flap member 12 is disposed) and pushes the partition or flap 12 by its free edge to cause it to swing downward (as shown in Fig. 3) to form a partition or wall across the interior of the box 10. Preferably the flap 12 is of such size that its free lower edge will firmly press against the inner face of the side wall of the box 10 to cause the flap to bind and resist displacement.

The box 10 is now ready to be used as an exposure meter. The flaps 11 at each end of the box being flared out (or removed if desired), the user holds up to one eye the end of the box nearest the partition or flap member 12 and directs the other end of the box toward the subject to be photographed. The user then ascertains the particular aperture 17 through which the general details of the subject can just be seen. Assume, for purposes of illustration, that this particular aperture 17 happens to be the one numbered 4. Reference is then made to the chart or table 19 on the side wall of the box 10. If the object to be photographed is in sunlight on an average clear day, the user will refer to the column of numerals labelled "Clear-average," and upon finding the numeral 4 therein, will read the horizontal row of stop numbers opposite and in line with such numeral 4. Thus the user will observe that the proper exposure under such light conditions is $\frac{1}{10}$ sec. at f 16, $\frac{1}{25}$ sec. at f 11, $\frac{1}{50}$ at f 8, $\frac{1}{100}$ at f 5.6, $\frac{1}{250}$ at f 4 and $\frac{1}{500}$ at f 2.8. If the light conditions come within the "Cloudy-dull" classification, the user will read the horizontal row of f-stop numbers in line with the numeral 4 in the column labelled "Cloudy-dull." Likewise, if the subject is under artificial light the column headed "Mazda" would be referred to and if the aperture 17 indicated by the number 4 is selected, the user will read the horizontal row of stop numbers which is in line with the number 4 in the column labelled "Mazda" to determine the proper shutter speeds and lens openings to use.

While my invention has been illustrated in connection with a box or container for relatively short lengths of film of the type used in so-called "still" cameras, it may be employed with boxes or cartons used for motion picture type film.

Although I have described the present invention in connection with the description of specific embodiments thereof, it is not intended that the details set forth shall be regarded as limitations upon the scope of the invention, except insofar as included in the accompanying claims.

I claim:

1. In a device of the class described, a photographic film carton adapted to be opened at each of its ends, and a movable flap carried by said carton and adapted to be positioned to form a transverse partition within said carton, said flap being provided with visual or optical light measuring means.

2. In a device of the class described, a photographic film carton adapted to be opened at each of its ends, and a movable flap secured within said carton and adapted to be positioned to form a transverse partition within said carton, said flap being provided with visual or optical light measuring means.

3. In a device of the class described, a photographic film carton adapted to be opened at each of its ends, and a movable flap secured within said carton and adapted to be positioned to form a transverse partition within said carton, said flap having a plurality of apertures of varying transparency thereby providing a visual or optical light measuring means.

4. In a device of the class described, a photographic film carton adapted to be opened at each of its ends, a movable flap secured within said carton and adapted to be positioned to form a transverse partition within said carton, said flap having a plurality of apertures of varying transparency thereby providing a visual or optical light measuring means, and an exposure chart associated with said carton and so integrated with said light measuring means that the correct exposure for the film contained in said carton may be determined.

WILLIAM C. LOCKWOOD.